United States Patent [19]
Steil et al.

[11] 3,762,230
[45] Oct. 2, 1973

[54] PULLEY AND SHAFT ASSEMBLY FOR ROTARY LAWN MOWER

[75] Inventors: William W. Steil, Wauwatosa; Bryan E. Domin, Hales Corners, both of Wis.

[73] Assignee: Production Stamping Corporation, Milwaukee, Wis.

[22] Filed: June 23, 1972

[21] Appl. No.: 265,720

[52] U.S. Cl. ................. 74/230.3, 56/255, 56/320.1
[51] Int. Cl. ............................................ F16h 55/36
[58] Field of Search .................... 74/230.8, 230.3, 74/230.01; 56/17.5, 255, 295, 320.1, 320.2, 11.3, 11.6, 6

[56] References Cited
UNITED STATES PATENTS

| | | | |
|---|---|---|---|
| 2,403,236 | 7/1946 | Phelps | 56/295 |
| 3,236,034 | 2/1966 | Blettner | 56/6 |
| 2,899,793 | 8/1959 | Swisher | 56/11.6 |
| 2,991,612 | 7/1961 | Holmes | 56/6 |
| 2,734,327 | 2/1956 | Whittney | 56/255 |
| 909,506 | 1/1909 | Zimmerer | 74/230.8 |
| 1,352,829 | 9/1920 | Nelson | 74/230.8 |

*Primary Examiner*—Charles J. Myhre
*Assistant Examiner*—R. H. Lazarus
*Attorney*—Arthur L. Morsell, Jr.

[57] ABSTRACT

A cylindrical sleeve for a lawn mower drive shaft is formed from two hollow tubes each of which has an inturned annular flange on one end thereof. An annular collar for supporting the sleeve is placed between the inturned flanged ends of the two tubes and a hollow rivet is passed through the inturned flanges and the inner periphery of the annular collar. The rivet is headed to secure the two inturned flanges and the supporting collar tightly together, thereby forming a cylindrical sleeve having a supporting collar intermediate the ends thereof. A drive shaft is journalled within the cylindrical sleeve and a saddle for the lawnmower blade is welded to one end of the drive shaft, and a drive pulley to the other end.

7 Claims, 9 Drawing Figures

PATENTED OCT 2 1973 3,762,230
SHEET 1 OF 2
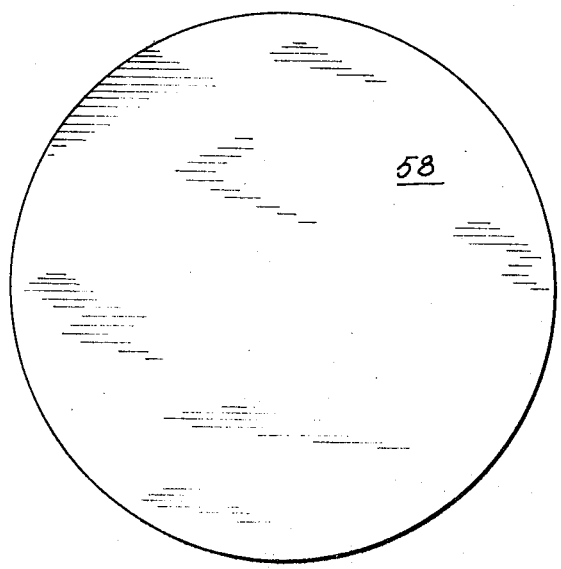
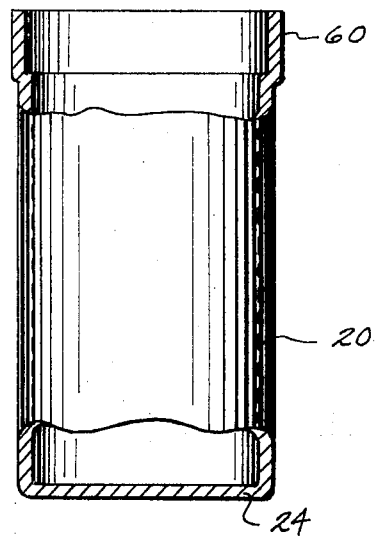
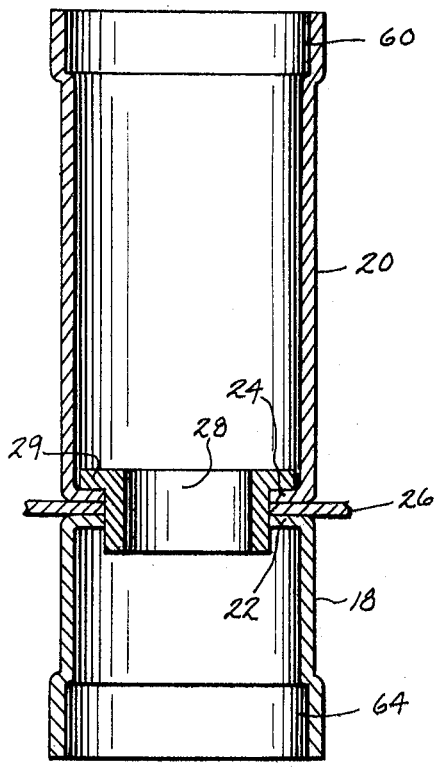
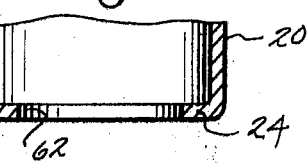
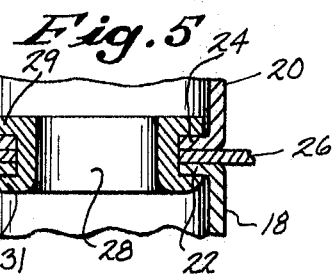
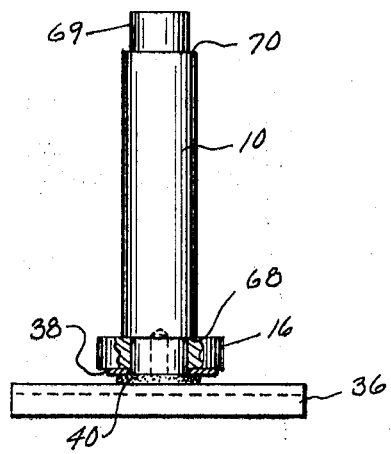

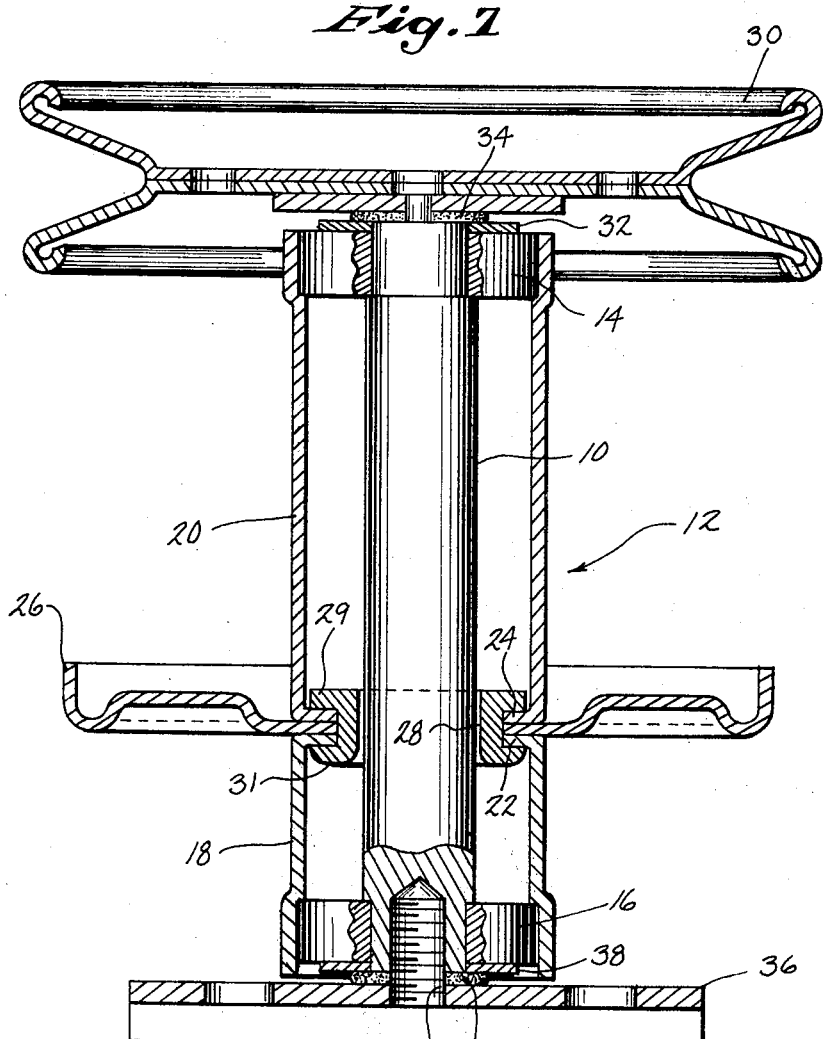
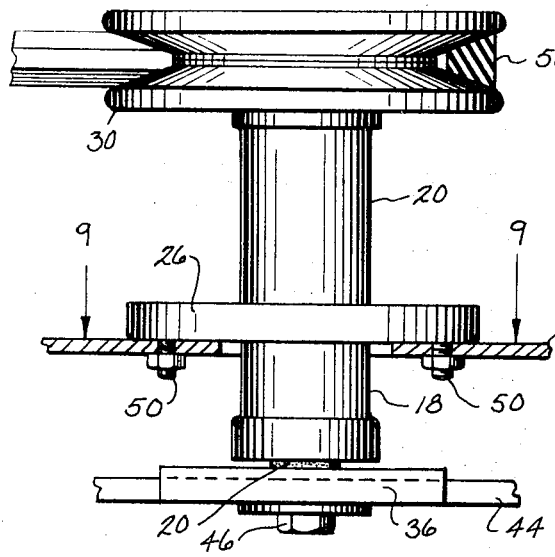
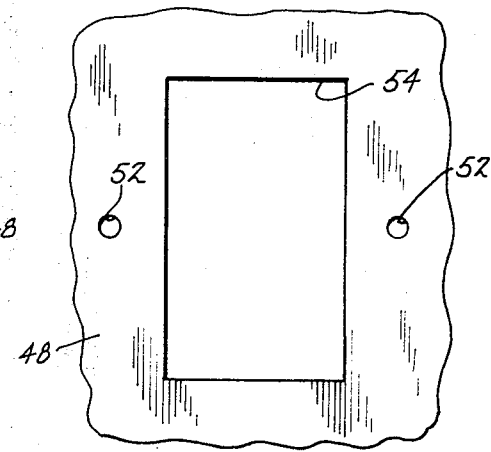

PULLEY AND SHAFT ASSEMBLY FOR ROTARY LAWN MOWER

BACKGROUND OF THE INVENTION

This invention relates to pulley and shaft assemblies for the mower blades of rotary lawn mowers, and is used in that type of mower where a drive shaft extends rotatably through the top of the mower housing, there being a pulley for a belt drive at the upper end of the shaft above the mower housing, and there being a saddle for the mower blade at the lower end of the shaft below the mower housing.

Heretofore in the manufacture of pulley and shaft assemblies for the above-noted type of lawn mower, the pulley and blade saddle have been connected to their respective ends of the shaft with drive pins, and the shaft has been suitably supported for rotation through an opening in the top of the mower housing. This type of assembly is expensive to manufacture in that there is considerable labor involved in connecting the blade saddle and pulley to the shaft with drive pins and in performing the other assembly steps. In my co-pending applicaiton Ser. No. 173,982, now U.S. Pat. No. 3,727,475 it is proposed to have the drive shaft journalled in a sleeve having an annular bulge intermediate the two ends thereof, a supporting collar for securing the sleeve to the lawn mower housing being friction welded to the annular bulge. With the present invention, however, it has been found that improved characteristics and lower costs can be achieved.

Accordingly, the principal object of this invention is to provide a pulley and shaft assembly which has improved characteristics and lower cost.

An additional object of this invention is to provide a pulley and shaft assembly in which the sleeve supporting the shaft is made from two tubes, each of which has an inturned annular flange on the end thereof, the tubes being held together by a hollow rivet which also secures a supporting collar between the two annular flanges.

A further object of this invention is to provide a pulley and shaft assembly of the above-noted character which is sturdy in structure and reliable in operation.

SUMMARY OF THE INVENTION

In accordance with this invention, the above-noted objects are attained by providing two hollow tubes, each of which has an inturned annular flange on one end thereof. An annular collar for supporting the tubes is placed between the inturned annular flanges of the two tubes and a hollow rivet is passed through the inturned annular flanges and through the inside periphery of the annular collar. The rivet is headed to secure the two inturned flanges and the collar tightly together, thereby forming a cylindrical sleeve having a supporting collar intermediate its ends. A drive shaft is journalled within the cylindrical sleeve and a drive pulley is welded to one end of the drive shaft. Means for receiving a lawn mower blade is welded on the other end of the drive shaft.

BRIEF DESCRIPTION OF THE DRAWINGS

FIG. 1 is a plan view of a sheet metal blank which is to be deep drawn to form a tube having an inturned annular flange on one end thereof;

FIG. 2 is a side view of a deep drawn tube with the top and bottom portion thereof being broken away and shown in cross-section;

FIG. 3 is a detail sectional view showing the bottom of the deep drawn tube of FIG. 2 with an opening formed in the closed end thereof to form an inturned annular flange around said end;

FIG. 4 is a longitudinal sectional view of two tubes having inturned annular flanges and having an annular supporting collar positioned between the flanges, there being a hollow rivet extending through the inturned annular flanges and the inner periphery of the supporting collar;

FIG. 5 is a detail sectional view showing the central portion of the assembly of FIG. 4 with the hollow rivet headed over to secure the assembly together as an integral unit;

FIG. 6 is a side view of a drive shaft for a rotary lawn mower with a blade saddle welded to one end thereof and with a ball bearing assembly mounted on the drive shaft adjacent to the blade saddle;

FIG. 7 is a longitudinal sectional view of one illustrative embodiment of the invention in its completely assembled form;

FIG. 8 is an elevational view showing the embodiment of FIG. 7 attached to a lawn mower housing with the pulley thereof engaged by a drive belt and with a rotary lawn mower blade attached to the saddle, the belt and housing being shown in section; and FIG. 9 is a fragmentary detail plan view taken upon the line 9—9 of FIG. 8.

DETAILED DESCRIPTION OF THE INVENTION

Referring to FIG. 7, one illustrative embodiment of the invention includes a drive shaft 10 which is journalled within a cylindrical sleeve 12 by means of bearings 14 and 16. The cylindrical sleeve 12 is made from two tubes 18 and 20, each of which has an inturned annular flange. The inturned annular flanges 22 and 24 are located on opposite sides of the inner periphery of a supporting collar 26 and the three units, i.e., the tubes 18 and 20 and the collar 26, are secured together by means of a tubular rivet 28 which extends through the openings of the annular flanges 22 and 24 and through the inner periphery of the supporting collar 26. Rivet 28 has a preformed head 29 on one end thereof and a swaged head 31 on the other end thereof.

A drive pulley 30 is friction welded to one end of the drive shaft 10 with a washer 32 being located between the pulley 30 and the bearing 14. A welding bead 34 is indicated between the end of the shaft 10 and the central portion of the pulley 30. At the other end of the shaft 10, a saddle 36 is friction welded to the end of the shaft 10 with a washer 38 being located between the saddle 36 and the bearing 16. A welding bead 40 is indicated between the saddle 36 and the end of the shaft 10. A tapped opening 42 is formed through the saddle 36 and into the end of the shaft 10 to receive a bolt which removably holds the lawn mower blade 44 against the saddle 36 as shown in FIG. 8, there being a bolt 46 which is screwed into the threaded opening 42. The supporting collar 26 is attached to the lawn mower housing 48 by means of bolts 50 which extend through openings 52 in the lawn mower housing 48 and through matching openings in the collar 26. A rectangular opening 54 is cut in the lawn mower housing between bolt holes 52 and is long enough to admit the saddle 36 through the long dimension thereof. The shaft 10 is adapted to be rotated by means of a drive belt 56 which extends between the pulley 30 and a motor (not shown).

The tubes 18 and 20 which make up the cylindrical sleeve 12 are preferably formed by a deep drawing operation on circular blanks such as the blank 58 indicated in FIG. 1. FIG. 2 shows the first step in forming a tube 20. During the first drawing operation the tube 20 is cupped as shown in FIG. 2 and is expanded at the upper end as at 60 to form a bearing seat. FIG. 3 shows the lower end of the tube 20 after the next operation in which a bottom opening 62 is cut in the bottom so as to define an annular inturned flange 24 whose inner periphery forms the margin of the opening 62. A similar tube 18 (see FIG. 4) is formed by the same operation, the tube 18 having an expanded end 64 for forming a bearing seat.

The two tubes 18 and 20 are placed with their inturned annular flanges 22 and 24 adjacent opposite sides of a supporting collar 26, and a hollow rivet having a head 29 is passed through the opening in the center of the assembly as shown in FIG. 4. The lower end of the rivet 28 is then headed over as at 31 in FIG. 5 to hold tubes 18 and 20 together and form a cylindrical sleeve which has a supporting collar 26 intermediate its ends.

FIG. 6 shows a drive shaft 10 having a saddle member 36 friction welded to one end thereof and having a bearing 16 secured between a washer 38, which is adjacent to the weld bead 40, and a shoulder 68 on the shaft 10. A portion 69 of reduced diameter to provide a shoulder 70 is formed at the other end of the shaft 10 for seating a bearing. In the manufacture of this embodiment of the invention, the shaft 10, bearing 16, and saddle assembly 36 shown in FIG. 6 are passed through the tubular rivet 28 of the assembly shown in FIG. 5 and a bearing similar to the bearing 14 is thereafter slipped onto the shaft and seated against the shoulder 70. A pulley 30 is thereafter welded to the end of the shaft 10 above the bearing.

Although it is preferable to make the tubes 18 and 20 by the deep drawing process described above, they can also be formed by cutting off pieces from a length of tubular stock and spinning the end of each piece to form the inturned annular flanges 22 and 24 and also to form the bearing seat on the opposite end of each tube.

Various other modifications of the above-disclosed structure will be apparent to those skilled in the art, and this invention includes all such modifications as may fall within the scope of the following claims.

What we claim is:

1. A pulley and shaft aassembly comprising two hollow tubes each having an inturned annular flange formed at one end thereof forming the margin of an opening, which openings are aligned with each other, an annular supporting collar having an outside diameter which is larger than the outside diameter of said tubes and having an inside diameter which is smaller than the inside diameter of the tubes, said annular supporting collar being positioned between said inturned annular flanges, a tubular rivet extending through the openings of said inturned annular flanges and through said annular supporting collar, heads formed on opposing ends of said tubular rivet to hold said inturned annular flanges and said annular supporting collar together and thereby form a cylindrical sleeve having an annular supporting collar intermediate the ends thereof, a drive shaft journalled within said cylindrical sleeve and extending through said hollow rivet, a drive pulley welded to one end of said drive shaft, and means welded to the other end of said drive shaft for receiving a rotary lawn mower blade.

2. A pulley and shaft assembly as defined in claim 1 wherein the inner diameters of said inturned annular flanges are substantially equal to each other.

3. A pulley and shaft assembly as defined in claim 2 wherein the inner diameter of said annular supporting collar is substantially equal to the inner diameters of said inturned annular flanges.

4. A pulley and shaft assembly as defined in claim 3 wherein the outside diameter of said tubular rivet is slightly smaller than the inner diameter of said inturned annular flanges and annular supporting collar.

5. A pulley and shaft assembly as defined in claim 1 wherein there are bearing assemblies at the ends of said sleeve and wherein said drive shaft is journalled through said bearing assemblies, the ends of said drive shaft being of reduced diameter to provide shoulders which serve as seats for said bearings, and the unflanged ends of said hollow tubes being expanded to provide seats for the outer periphery of said bearings.

6. A method of manufacturing a rotary drive assembly for the blade of a rotary lawn mower, said method comprising the steps of:
   a. providing a drive shaft;
   b. welding a blade holder to one end of said drive shaft;
   c. providing inturned annular flanges on one end of each of two hollow tube portions with each flange defining a circular opening;
   d. providing support means with a circular opening of less size than the inner diameters of said tube portions;
   e. positioning the flanged ends of the tube portions on opposite sides of said opening in the support means whereby the axes of the openings in the inturned flanges and support means are aligned;
   f. inserting a hollow rivet through said aligned openings with its head engaging the inturned flange of one tube portion;
   g. heading the opposite end of the rivet to clamp the support means between the two inturned flanges;
   h. inserting said drive shaft through the tube portions and hollow rivet with the blade holder adjacent one end of the connected tube portions; and
   i. attaching a drive pulley to the other end of said drive shaft adjacent the other end of the connected tube portions.

7. A method as defined in claim 6 and including the steps of:
   a. forming reduced portions on opposite ends of the drive shaft to provide shoulders spaced from said ends;
   b. slipping a bearing assembly onto said reduced portion at one end of the drive shaft to seat against said shoulder prior to welding the blade holder to said end;
   c. similarly slipping a bearing assembly onto the reduced portion at the opposite end of the drive shaft; and
   d. expanding the end of each tube portion which is opposite the end with the inturned flange to provide external seats for said bearing assemblies.

* * * * *